(12) United States Patent
Clark et al.

(10) Patent No.: US 10,650,363 B2
(45) Date of Patent: *May 12, 2020

(54) SELF-DEPOSIT APPARATUS

(71) Applicant: Walmart Apollo, LLC, Bentonville, AR (US)

(72) Inventors: Jimmie Russell Clark, Fayetteville, AR (US); Jeffrey Stone, Bentonville, AR (US); Michael Lawerance Payne, Centerton, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/441,947

(22) Filed: Jun. 14, 2019

(65) Prior Publication Data
US 2019/0295057 A1  Sep. 26, 2019

Related U.S. Application Data

(63) Continuation of application No. 16/213,161, filed on Dec. 7, 2018, now Pat. No. 10,332,086, which is a
(Continued)

(51) Int. Cl.
*G06K 9/00* (2006.01)
*G06F 17/00* (2019.01)
(Continued)

(52) U.S. Cl.
CPC ......... *G06Q 20/18* (2013.01); *G06K 7/10722* (2013.01); *G06K 7/1413* (2013.01); *G06K 7/1417* (2013.01); *G07F 7/06* (2013.01)

(58) Field of Classification Search
USPC ....... 382/100, 103, 106, 123, 140, 168, 173, 382/181, 189–194, 209, 219–220, 298,
(Continued)

(56) References Cited

U.S. PATENT DOCUMENTS 4,803,348 A  2/1989  Lohrey et al.
6,794,586 B1  9/2004  Mason
(Continued)

FOREIGN PATENT DOCUMENTS

CN  104361693 A  2/2015
CN  204856760 U  12/2015

OTHER PUBLICATIONS

International Search Report and Written Opinion from related PCT application PCT/US2017/016020 dated May 1, 2017.
(Continued)

*Primary Examiner* — Seyed H Azarian
(74) *Attorney, Agent, or Firm* — McCarter & English, LLP; David R. Burns

(57) ABSTRACT

The present disclosure deals with an apparatus and method associated with a self-depositing of items. In exemplary embodiments, an item may be self-deposited using a self-deposit apparatus. In exemplary embodiments, self-deposit apparatus may include an optical reader, first scale, image capturing device, a bin and a second scale. The first scale may be coupled with the optical reader and image capturing device. The item may be placed on self-deposit apparatus and the weight and image may be captured. The self-deposit apparatus may extract the dimensions of the item from the captured image. The self-deposit apparatus may verify the item intended for the self-deposit is associated with the item identified by the identifier by matching the weight, dimension and image of the item to a stored item weight, dimensions and image.

19 Claims, 5 Drawing Sheets

Related U.S. Application Data continuation of application No. 15/420,587, filed on Jan. 31, 2017, now Pat. No. 10,185,943.

(60) Provisional application No. 62/290,177, filed on Feb. 2, 2016.

(51) Int. Cl.
  *G06Q 20/18* (2012.01)
  *G06K 7/10* (2006.01)
  *G07F 7/06* (2006.01)
  *G06K 7/14* (2006.01)

(58) Field of Classification Search
  USPC ............ 382/312, 321, 135; 235/375; 74/512
  See application file for complete search history.

(56) References Cited

U.S. PATENT DOCUMENTS

| | | | |
|---|---|---|---|
| 7,580,860 | B2 | 8/2009 | Junger |
| 8,708,233 | B2 | 4/2014 | Hammond et al. |
| 8,789,748 | B2 * | 7/2014 | Waugh ................ G06K 9/2036 235/375 |
| 2001/0037207 | A1 | 11/2001 | Dejaeger |
| 2002/0019783 | A1 | 2/2002 | Chol |
| 2003/0018897 | A1 | 1/2003 | Bellis et al. |
| 2003/0024340 | A1 * | 2/2003 | Toennesland ....... B60B 33/0042 74/512 |
| 2005/0240958 | A1 | 10/2005 | Nguyen et al. |
| 2013/0001295 | A1 * | 1/2013 | Goncalves .......... G07G 1/0063 235/375 |
| 2013/0223673 | A1 | 8/2013 | Davis et al. |
| 2013/0248593 | A1 * | 9/2013 | Bonner .................. G06F 16/00 235/375 |
| 2014/0039998 | A1 | 2/2014 | Hancock et al. |
| 2016/0210738 | A1 * | 7/2016 | Curlander ................ G06K 9/78 |

OTHER PUBLICATIONS

3M(TM) Intelligent Return: Owner's Manual, Built to Exceed Expectations, 3M, 2011.

U.S. Appl. No. 16/213,161, filed Dec. 7, 2018, Jimmie Russell Clark et al.

Office Action and Search Report from related Chinese Patent Application No. 201780009691.3 dated Nov. 1, 2019.

First Office Action, Chinese and English translation, from related Chinese Patent Application No. 201780009691.3 dated Nov. 1, 2019.

* cited by examiner

SELF-DEPOSIT APPARATUS

CROSS-REFERENCE TO RELATED PATENT APPLICATION

This application is a continuation of U.S. patent application Ser. No. 16/213,161 filed on Dec. 7, 2018, which is a continuation of U.S. patent application Ser. No. 15/420,587 filed on Jan. 31, 2017, which claims priority to U.S. Provisional Application No. 62/290,177 filed on Feb. 2, 2016, the contents of all of the above applications are hereby incorporated by reference in its entirety.

BACKGROUND

Many self-deposit apparatuses may initiate a self-deposit for a specific item and physically receive an item for self-deposit without the adequately verifying that the item received is actually the item that was identified for self-deposit by the user. The lack of verification may cause problems as incorrect items may be physically deposited in the self-deposit apparatus.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
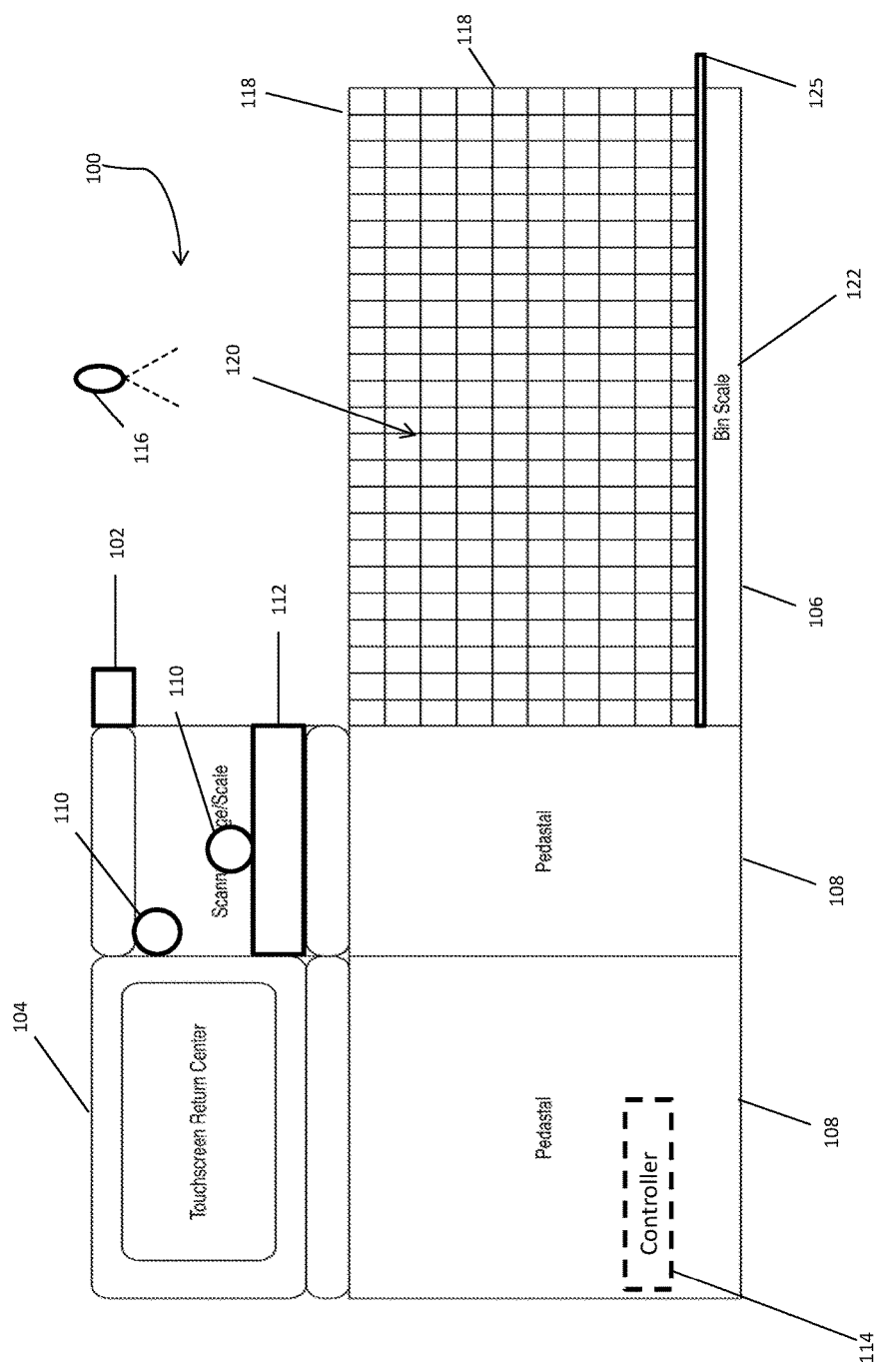
FIG. 1 is a block diagram showing a self-deposit apparatus according to exemplary embodiments of the present disclosure.

Described in detail herein are systems, apparatus, methods, and non-transitory computer-readable media associated with a self-depositing of items. In exemplary embodiments, a self-deposit apparatus can verify that items being deposited by users correspond to the items identified by the user for deposit. Exemplary embodiments of the self-deposit apparatus can include an optical reader, one or more scales, one or more image capturing devices, a controller, and a bin. An item to be deposited can be identified by the self-deposit apparatus based on an identifier that is read by the optical reader and/or based on user input received via a user interface of the self-deposit apparatus. A first scale can be coupled with the optical reader and image capturing device. The item may be placed on the first scale of the self-deposit apparatus and the first scale can determine the weight of the item. While the item is supported by the first scale, the image capturing device(s) can capture one or more images of the item. For example, an image capturing device can be disposed adjacent to the first scale and/or an image capturing device can be disposed opposite or above the first scale. In some embodiments, the image(s) can be captured substantially concurrently with the weighing of the item by the first scale. In some embodiments, an image capturing device can be disposed adjacent to or above the bin to capture images of items that have been deposited in the bin. The self-deposit apparatus can extract one or more dimensions of the item from the captured image. The self-deposit apparatus can verify the item intended for the self-deposit by the user corresponds to the item identified based on reading of the identifier and inputs from the user. For example, in exemplary embodiments of the present disclosure, the self-deposit apparatus can verify that the item placed on the first scale by matching the weight, dimensions, and image(s) to stored item weight, dimensions and image(s).

In exemplary embodiments, the bin can include side walls that define an interior area for receiving items after determining the weight of the item and capturing one or more images of the item. In exemplary embodiments, a bottom surface of the bin can be formed by or with a scale (e.g., a second scale). The scale can be configured to determine the weight of the item after the item is placed in the bin.

The controller can be configured to extract a set of dimensions of the item from the image(s) captured by the image capturing device(s) of the self-deposit apparatus. For example, the can use machine vision, image matching, pixel matching, and/or any other suitable techniques for determining the dimensions of an item from one or more images of the item. The controller can verify that the item deposited in the bin is associated with the identifier read by the optical reader based on, for example, the captured image(s) of the item, the dimensions of the item as extracted from the image(s) by the controller, and the measured weights of the item.

In exemplary embodiments, the controller can be configured to query a database using the identifier and/or user inputs associated with the item to be deposited to retrieve one or more stored images of the item, a stored weight of the item, and stored dimensions of the item. The controller can compare the one or more images of the item intended for deposit that are captured by the image capturing device(s) to the stored image of the item, compare the dimensions of the item intended for deposit that are extracted from the captured images to the stored dimensions of the item, and compare the weight of the item intended for deposit measured by the first scale to the stored weight of the item.

In exemplary embodiments, the controller can be configured to determine a probability that the item deposited in the bin is associated with the identifier read by the optical reader and/or the user inputs based on the captured image, the dimensions extracted from the captured images, and the measured weights of the item. For example, the captured images, extracted dimensions, and/or measured weights may not exactly match the stored images, dimensions, and/or weight of the item. Such difference can result in uncertainty that the item to be deposited is actually the item that has been deposited. The probability can be determined by assigning variable weighting factors to the outcome of the comparisons of the weight, image and dimensions. Using the probability, the controller verifies with a specified degree of certainty that the item deposited in the bin corresponds to the identifier read by the optical reader and/or the user inputs.

FIG. 1 is a block diagram showing a self-deposit apparatus according to exemplary embodiments of the present disclosure. In exemplary embodiments, the self-deposit apparatus 100 can include a controller 114, a display 104, an optical reader 102, a scale 112, image capturing devices 110, and a bin 106. The display device 104 can be operatively coupled to the controller 114 and can render graphical user interfaces (GUIs) generated by the controller 114 to facilitate the self-deposit process. In exemplary embodiments, the display 104 may include an integrated keyboard and/or provide a virtual keyboard through a touchscreen interface of the display 104. In other embodiments, the keyboard may be separate from the display 104.

In exemplary embodiments, the optical reader 102 operatively coupled to the controller 114 and configured to read an identifier (e.g., an encoded machine readable representation) associated with an item intended for deposit. For example, the identifier can be a barcode and/or a QR code and the optical reader can be a barcode and/or QR code reader configured to read the barcode and/or QR code. The optical reader 102 can be configured to read encoded information from machine-readable representations and transmit the decoded information to the controller 114. Alternatively, the optical reader 102 can transmit encoded information to the controller and the controller can decode the encoded information.

In response to obtaining the decoded information, the controller 114 can retrieve an identification of an item to be deposited and/or can retrieve a list of items corresponding to the decoded information. The controller 114 controls the display to render the identified item or the list of items, which can be selected by the user. For example, when the identification of the item is displayed the user can be asked to confirm that the displayed item corresponds to the item being deposited. When a list of items is displayed, the user can be prompted to select the item from the list to confirm which item the user intends to deposit.

The (first) scale 112 is operatively coupled to the controller 114 and can be configured to support an item to be deposited and to determine a weight of the item. In exemplary embodiments, the scale 112 can be disposed adjacent to the display 104. In exemplary embodiments, the scale 112 can be an electronic weighing machine configured to determine a weight of an item placed on the scale and to transmit the weight of the item to the controller 114.

The image capturing devices 110 can be operatively coupled to the controller and can be configured to capture one or more images of an item while the item is supported by the scale 112. In exemplary embodiments, the image capturing devices 110 can be disposed adjacent to the display 104. In exemplary embodiments, the image capturing devices 110 can be disposed adjacent to the scale 114 and/or can be positioned above the scale 112 to facilitate capture of images of the item placed on the scale 112. In exemplary embodiments, the scale 112 can have a planer horizontally disposed surface. The one or more image capturing device can be positioned and oriented to capture images of a volume above the scale surface from one or more points-of-view. In some embodiments, the one or more image capturing devices 110 can be positioned at or near the optical reader 102. In some embodiments, the image capture devices 110 can be configured to take moving images (e.g., video), still images or both. In exemplary embodiments, the image capturing device 110 can transmit captured images to the controller 114.

The bin 106 can be disposed adjacent to the scale 112 and/or the one or more image capturing devices 110. In exemplary embodiments, the bin 106 including side walls 118 that define an interior area 120 for receiving items after the self-deposit apparatus determines the weight and captures one or more images of the item. The interior area 120 of the bin 106 can have a volume that accommodates receipt of a single item or can have a volume that accommodates several items. A bottom surface of the bin can be formed with or by a (second) scale 122. The second scale 122 can be configured to determine a weight of the item or items after the item or items are placed in the bin 106. In some embodiments, the bin 106 can include a conveyer belt 125 to transport the item or items to another location after the item or items are disposed in the bin 106. The conveyer belt 125 may be disposed in belt cabinets, which may also include rollers (e.g., friction and drive rollers) and a drive motor. The driver motor can control one or more of the rollers to rotate the belt to provide a transport for moving items from one end of the belt cabinet to an opposite end of the belt cabinet.

In exemplary embodiments, a self-deposit can be initiated in response to reading an identifier of an item by the optical reader 102. The identifier can be displayed on the display 104. The item intended for self-deposit can be placed on the scale 112 and the scale 112 can output a weight of the item intended for self-deposit to the controller 114. The one or more image capturing devices 110 can capture one or more images of the item intended for self-deposit. The one or more images can be captured when the item is placed on the scale. For example, the image capturing device can capture one or more images of the item substantially concurrently to the weighing of the item on the scale. The controller 114 receives the weight of the item from the scale 112 and the one or more images of the item from the image capturing device 110. In exemplary embodiments, the controller 114 is configured to extract a set of dimensions of the item from the one or more images using machine vision, image mapping, and/or pixel matching. In exemplary embodiments, the controller 114 may extract the height, width, and length of the item. In other embodiments, the controller may only extract the height and width of the item, the height and the length, or the width and the length.

The controller 114 can query a central database using the identifier associated with the item to retrieve one or more stored images of the item, a stored weight of the item, and stored dimensions of the item. The controller 114 may compare the one or more images of the item intended for deposit to one or more stored images of the item, compare the set of dimensions of the item intended for deposit to stored dimensions of the item, and compare the weight of the item intended for deposit to the stored weight of the item to verify that the item intended for self-deposit is associated with the item identified by the identifier read by the optical reader 102. In exemplary embodiments, the controller 114 can compare the images using image recognition. In some embodiments, if the controller 114 is unable to retrieve one or more images from the central database, the controller 114 can be configured to verify the item being deposited corresponds to the identifier, by comparing the weight and dimensions of the item.

In exemplary embodiments, the controller 114 is further configured to determine a probability that the item intended for deposited is associated with the identifier read by the optical reader based on the captured image, the set of dimensions, and/or the first weight. In exemplary embodiments, the probability is calculated by assigning variable weighting factors to the outcome of the comparison of the weight, image and dimensions. For example, the comparison of the weight can be assigned a higher weighting factor than the comparison of the dimensions, and the comparison of the dimensions can be assigned a higher weighting factor than the comparison of the images. Consequently, if the weight of the item intended for self-deposit is substantially equal to the stored weight, the dimensions of the item intended for self-deposit are substantially equal to the stored dimensions, however, the image of the item intended for self-deposit does not substantially match the stored image, the controller 114 may calculate a high probability that the item intended for deposit is associated with the item identified by the identifier based on the assigned weighting factors. Conversely, if the first weight of the item intended for deposit and the stored weight are not substantially equal, the dimensions of the item intended for deposit and the stored dimensions are substantially equal, and the image of the item intended for deposit and the stored image do substantially match, the controller 114 can calculate a lower probability that the item intended for deposit is associated with the item identified by the identifier based on the assigned weighting factors. In exemplary embodiments, the controller 114 verifies the item intended for deposit is associated with the identifier read by the optical reader based on whether the probability is over a threshold. For example, the controller 114 may verify the intended for deposit is the associated with the identifier if the calculated probability is over 90%.

In exemplary embodiments, in response to the controller 114 verifying the item intended for deposit is associated with the item identified by the identifier, the user may be prompted to place the item in the bin 106 and the bin 106 may receive the item for collection. In exemplary embodiments, the scale 122 associated with the bin 106 and determines a weight of the item or items placed in the bin 106. For example, the controller 114 may receive the second weight to confirm the item placed on the first scale 112 is the same item received by the bin 106. That is, the scale 112 can used to determine that the item that was placed in the bin 106 has a weight that is substantially equal to the weight of the item that was weighed by the scale 112. For embodiments that permit multiple items to be deposited in the bin 106, the bin can determine the total weight of all items in the bin 106 and can determine that the incremental increases in weight as items are placed in the bin 106 correspond to the weight of each incrementally item determined by the scale 112.

In some embodiments, a second image capturing device 116 may be positioned over the bin 106. The second image capturing device may capture a second image of the item received by the bin 106. The controller 114 may receive the second weight and second image to confirm the item placed on the scale 112 is the same item received by the bin 106. In exemplary embodiments, the controller 114 may accept or deny the self-deposit based on the confirmation that the item placed on the scale 112 is the same as the item received by the bin 106. In some embodiments, the bin 106 is configured to receive a plurality of items for deposit, the scale 112 is configured to individually weigh each of the items, and the scale 122 is configured to collectively weigh the items.

Figure 2:
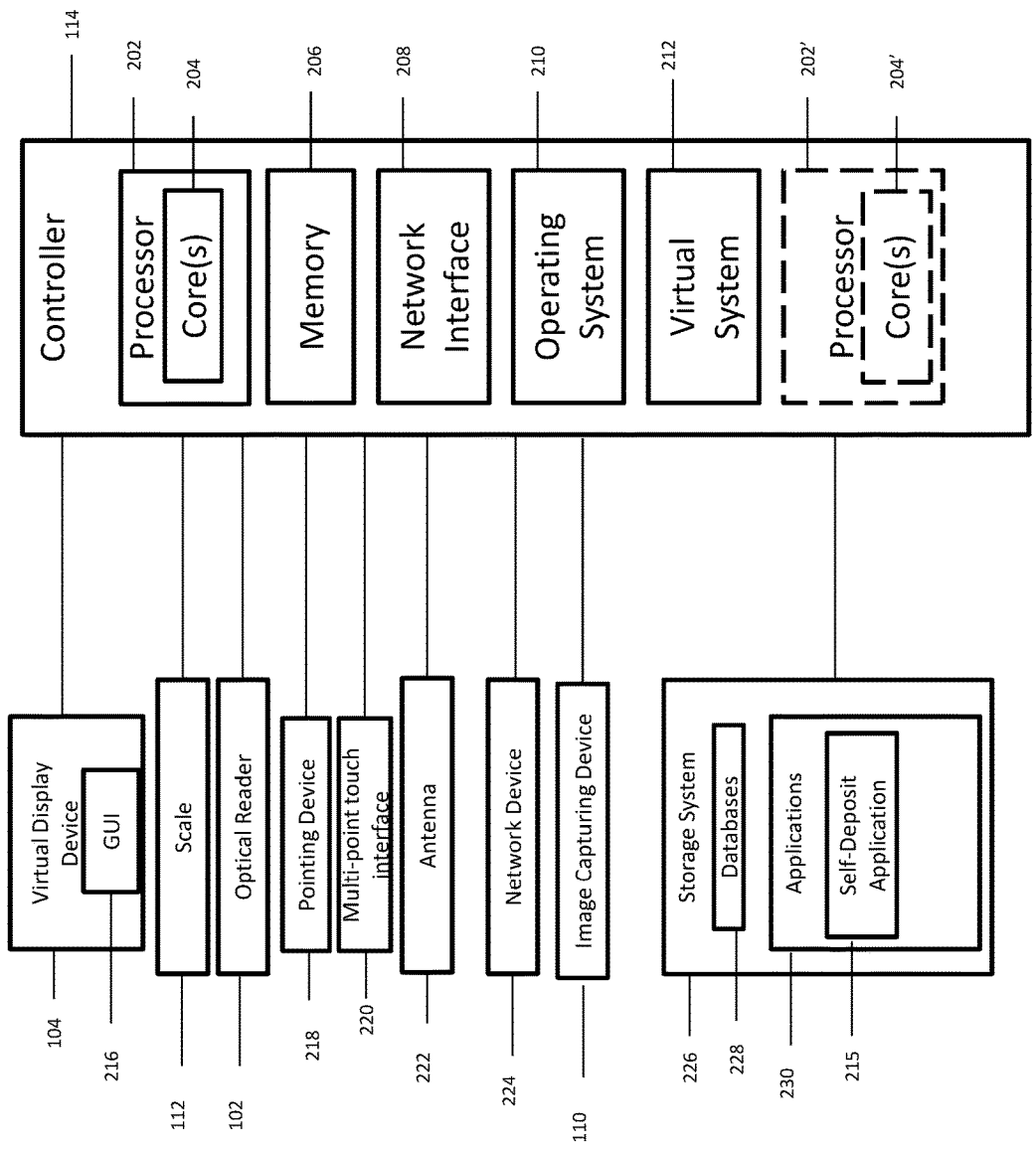
FIG. 2 is a block diagram of an example controller according to exemplary embodiments of the present disclosure.

FIG. 2 is a block diagram of an example controller 114 of a self-deposit apparatus according to exemplary embodiments of the present disclosure. The controller 114 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 206 included in the controller 114 may store computer-readable and computer-executable instructions or software (e.g., applications/firmware 230) for implementing exemplary operations of the controller 114 and the self-deposit apparatus including controlling an operation of the optical reader, scales, and image capturing devices. For example, the memory can store a self-deposit application 215. The controller 114 also includes configurable and/or programmable processor 202 and associated core(s) 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 (e.g., the self-deposit application 215) and other programs for implementing exemplary embodiments of the present disclosure. Processor 202 and processor(s) 202' may each be a single core processor or multiple core (204 and 204') processor.

Virtualization may be employed in the controller 114 so that infrastructure and resources in the controller 114 may be shared dynamically. A virtual machine 212 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

A user may interact with the controller 114 through the visual display device 104, which can display one or more graphical user interfaces 216 generated by the controller 114, a multi touch interface 220, and a pointing device 218.

The controller 114 can also include one or more storage devices 226, such as a hard-drive, CD-ROM, or other computer readable media, for storing data and computer-readable instructions and/or software that implement exemplary embodiments of the present disclosure (e.g., applications). For example, exemplary storage device 226 can include one or more databases 228. The databases 228 may be updated manually or automatically at any suitable time to add, delete, and/or update one or more data items in the databases.

The controller 114 can include a network interface 208 configured to interface via one or more network devices 224 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the controller 114 can include one or more antennas 222 to facilitate wireless communication (e.g., via the network interface) between the controller 114 and a network and/or between the controller 114 and the central database. The network interface 208 may include a built-in network adapter, network interface card, PCMCIA network card, card bus network adapter, wireless network adapter, USB network adapter, modem or any other device suitable for interfacing the controller 114 to any type of network capable of communication and performing the operations described herein.

The controller 114 may run any operating system 210, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the controller 114 and performing the operations described herein. In exemplary embodiments, the operating system 210 may be run in native mode or emulated mode. In an exemplary embodiment, the operating system 210 may be run on one or more cloud machine instances.

Figure 3:
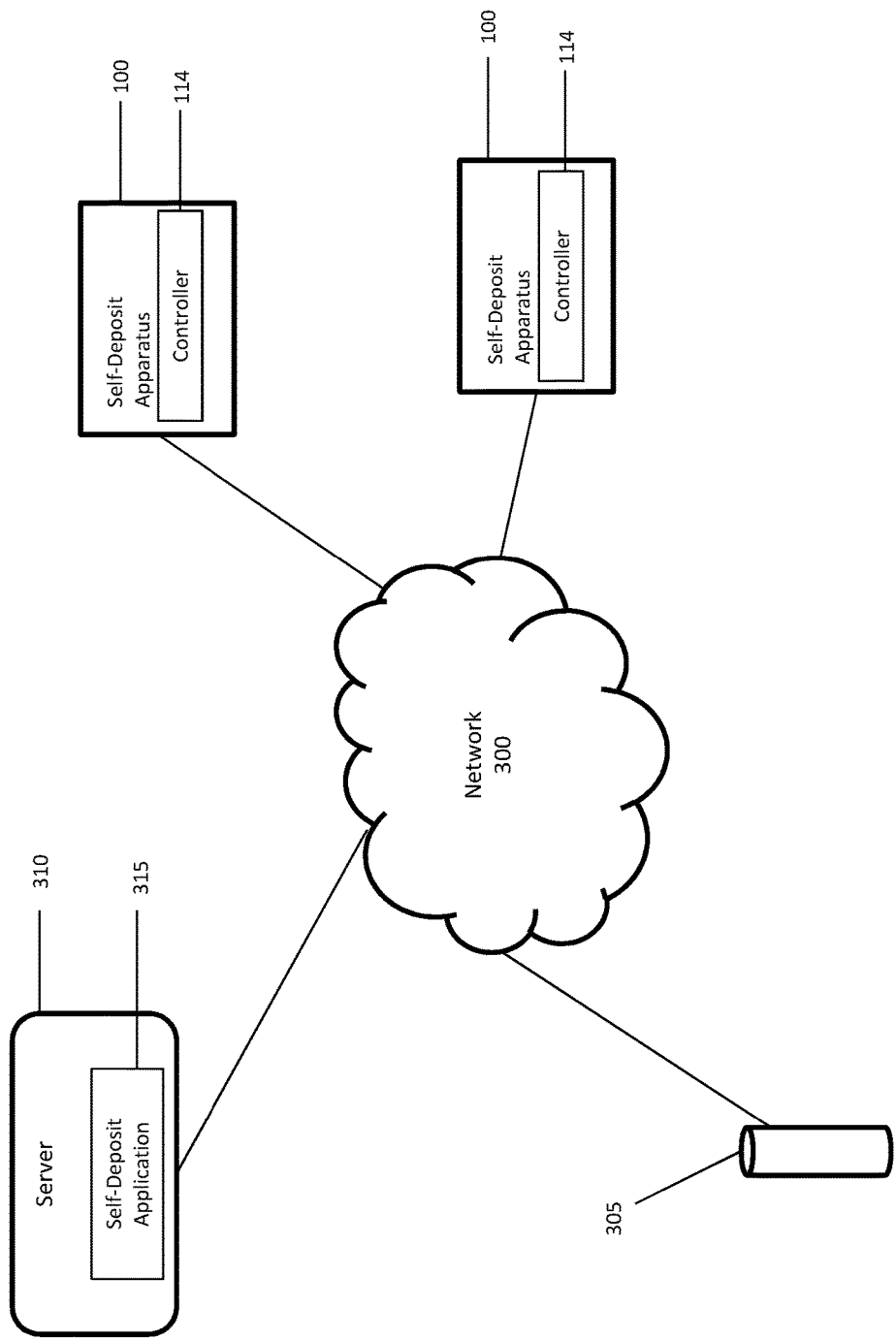
FIG. 3 illustrates an exemplary network environment including self-deposit apparatus communicatively according to exemplary embodiments.

FIG. 3 illustrates an exemplary network environment including self-deposit apparatus communicatively coupled with a central database according to exemplary embodiments. In exemplary embodiments, the network environment includes a network 300, self-deposit apparatus 100, a server 310, and database(s) 305. Each of the self-deposit apparatus 100, server 310, and databases 305 is in communication with the network 300.

In an example embodiment, one or more portions of network 300 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 310 and the database 305 are connected to the network 300 via a wired connection. Alternatively, the server 310 and the database 305 can be connected to the network 300 via a wireless connection. The server 310 includes one or more computers or processors configured to communicate with the controllers 114 of the self-deposit apparatus 100 and the database 305, via the network 300. The server 310 hosts one or more applications configured to interact with one or more components of the controllers 114 of the self-deposit apparatus 100 and/or facilitates access to the content of the database 305. The database 305 can include one or more storage devices for storing data and/or instructions (or code) for use by the server 310 and the self-deposit apparatus 100. The database 305 and server 310 can be located at one or more geographically distributed locations from each other or from the self-deposit apparatus 100. Alternatively, the database 305 can be included within server 310.

In some embodiments, the controller 114 of a self-deposit apparatus 100 can include a client side application that allows the self-deposit apparatus 100 to communicate and interact with the self-deposit application 315 hosted by the server 310. In exemplary embodiments, the self-deposit application 315 residing on the server 310 can be executed in response to the controller 114 receiving, the identifier of an item from the optical reader 102, the weight of the item from the (first) scale 112, and/or the one or more images of the item from the image capturing device 110. In exemplary embodiments, the server can execute the self-deposit application 315 may extract the dimensions of the item from the one or more images of the item intended for self-deposit. For example, the server can execute the self-deposit application 315 to extract the height, length, and/or width of the item intended for self-deposit from the one or more images.

In exemplary embodiments, the server 310 can execute the self-deposit application 315 to query the database(s) 305 to retrieve, a stored weight of the item, stored dimensions of the item, and one or more stored image of the item. The server 310 can execute the self-deposit application 315 to compare the image(s) of the item intended for deposit to the stored image(s) of the item, compare the set of dimensions of the item intended for deposit to the stored dimensions of the item, and/or compare the weight of the item intended for deposit to the stored weight of the item to verify that the item intended for self-deposit is associated with the item identified in response to reading the identifier by the optical reader 102. In some embodiments, if the server 310 is unable to retrieve the image from the database(s) 305, the server 310 can execute the self-deposit application 315 to compare the weight and dimensions of the item to the stored weight and dimensions.

In exemplary embodiments, the server 310 can execute the self-deposit application 315 to determine a probability that the item intended for deposited is associated with the identifier read by the optical reader 102 based on the captured image(s), the set of dimensions, and/or the determined weight of the item. In exemplary embodiments, the probability is calculated by assigning variable weighting factors to the outcome of the comparison of the weight, image and dimensions. For example, the comparison of the weight can be assigned a higher weighting factor than the comparison of the dimensions, and the comparison of the dimensions can be assigned a higher weighting factor than the comparison of the images. Consequently, if the weight of the item intended for self-deposit is substantially equal to the stored weight, the dimensions of the item intended for self-deposit are substantially equal to the stored dimensions, however, the image of the item intended for self-deposit does not substantially match the stored image, the self-deposit application 315 may calculate a high probability that the item intended for deposit is associated with the item identified by the identifier based on the assigned weighting factors. Conversely, if the first weight of the item intended for deposit and the stored weight are not substantially equal, the dimensions of the item intended for deposit and the stored dimensions are substantially equal, and the image of the item intended for deposit and the stored image do substantially match, the self-deposit application 315 can calculate a lower probability that the item intended for deposit is associated with the item identified by the identifier based on the assigned weighting factors. In exemplary embodiments, the self-deposit application 315 verifies the item intended for deposit is associated with the identifier read by the optical reader based on whether the probability is over a threshold. In exemplary embodiments, if the self-deposit application 315 is unable to retrieve an image of the item from the database(s) 305, however is able to verify that the item intended for self-deposit is the associated with the item identified by the identifier, the self-deposit application 315 may store the image captured of the item intended for self-deposit by the image capturing device 110 in the database(s) 305 to be associated with the item.

In exemplary embodiments, the server 310 can execute the self-deposit application 315 to receive the weight from the (second) scale 122 located in the bin 106 to confirm the item placed on the first scale 112 is the same item received by the bin 106. In some embodiments, one or more image capturing devices can be positioned over the bin 106. The image capturing device(s) can capture one or more images of the item received by the bin 106. The server 310 can execute the self-deposit application 315 to receive the weight and the image(s) to confirm the item placed on the scale 112 is the same item received by the bin 106. In exemplary embodiments, the server 310 can execute the self-deposit application 315 to accept or deny the self-deposit based on the confirmation that the item placed on the scale 112 is the same as the item received by the bin 106. In some embodiments, the bin 106 is configured to receive a plurality of items for deposit, the scale 112 is configured to individually weigh each of the plurality of items, and the scale 122 is configured to collectively weigh the plurality of items.

Figure 4:
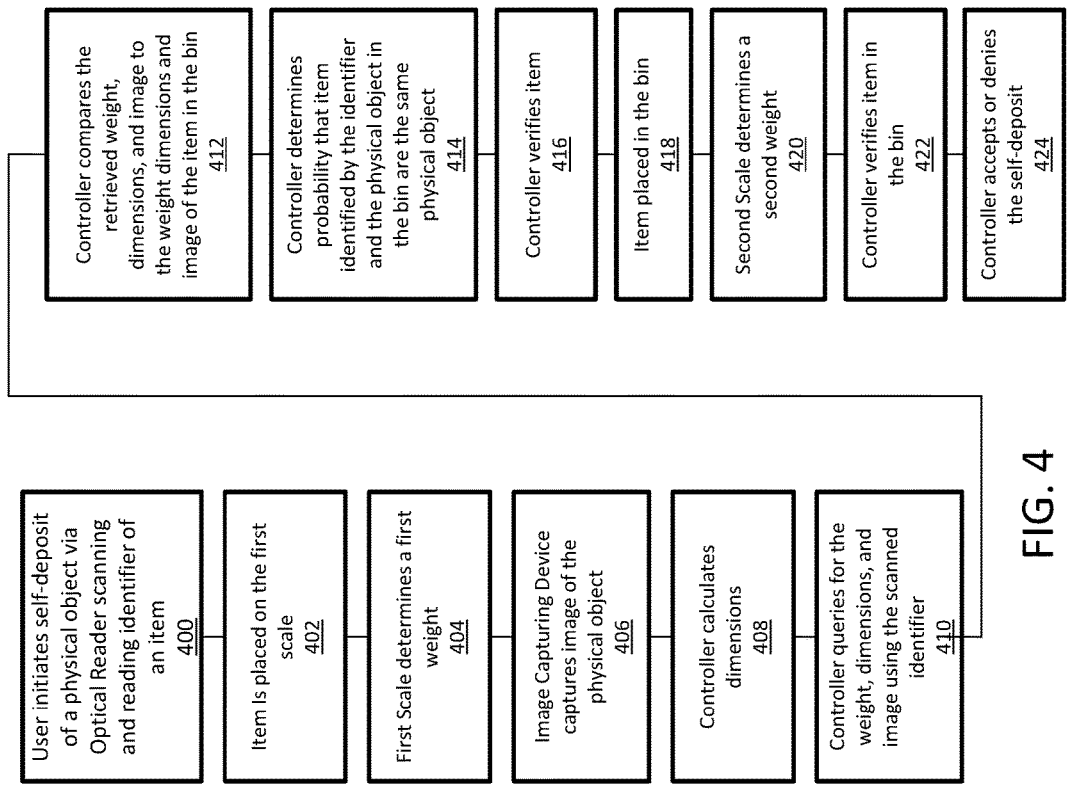
FIG. 4 is a flowchart illustrating an exemplary process of verifying items to be deposited in a self-deposit apparatus according to exemplary embodiments.

FIG. 4 is a flowchart illustrating an exemplary process of verifying items intended for deposit according to exemplary embodiments. In exemplary embodiments, in operation 400 the self-deposit is initiated in response to the optical reader 102 scanning and reading an identifier associated with an item intended for self-deposit. In exemplary embodiments, the optical reader 102 can be a barcode or QR reader, and the identifier is an encoded machine readable representation such as a barcode or a QR code.

In exemplary embodiments, in operation 402, the item intended for self-deposit is placed on the (first) scale 112. In operation 404, the scale determines a weight for the item intended for self-deposit. In operation 406, while the item intended for self-deposit is supported by the first scale 112, the one or more image capturing devices 112 capture one or more images of the item intended for self-deposit.

In operation 408, the self-deposit application 315 can be executed in response to the controller 114 receiving, the identifier of an item from the optical reader 102, the first weight of the item from the first scale 112, and/or the one or more images of the item from the image capturing device(s) 110. The dimensions of the item can be extracted from the one or more images of the item intended for self-deposit. For example, the self-deposit application 315 can be executed to extract the height, length, and/or width of the item intended for self-deposit from the image. In exemplary embodiments, the self-deposit application 315 may use image mapping to extract the dimensions of the item intended for self-deposit.

In operation 410 the self-deposit application 315 can be executed to query the database(s) 305 to retrieve, a stored weight of the item, stored dimensions of the item, and a stored image of the item. In operation 412, the self-deposit application 315 may compare the image of the item intended for deposit to the stored image of the item, compare the set of dimensions of the item intended for deposit to the stored dimensions of the item, and/or compare the first weight of the item intended for deposit to the stored weight of the item, to verify that the item intended for self-deposit is associated with the item identified by the identifier read by the optical reader 102. In some embodiments, if an image of the item cannot be retrieved from the database(s) 305, the weight and dimensions of the item can be compared to the stored weight and dimensions, respectively.

In operation 414, the self-deposit application 315 can be executed to determine a probability that the item intended for deposited is associated with the identifier read by the optical reader based on the one or more captured images, the set of dimensions, and/or the measured weight as described herein.

In exemplary embodiments, in operation 418, when the item has been verified, the display 104 can prompt the user to place the item in the bin 106. In operation 420, the self-deposit application 315 can be executed to receive a weight from the (second) scale 122 located in the bin 106 to confirm that the item placed on the scale 112 is the same item received by the bin 106. In operation, 422 the self-deposit application 315 can be executed to accept or deny the self-deposit based on the confirmation that the item placed on the scale 112 is the same as the item received by the bin 106. In some embodiments, the bin 106 is configured to receive a plurality of items for deposit, the scale 112 is configured to individually weigh each item to be deposited, and the scale 122 is configured to collectively weigh the items in the bin 106.

Figure 5:
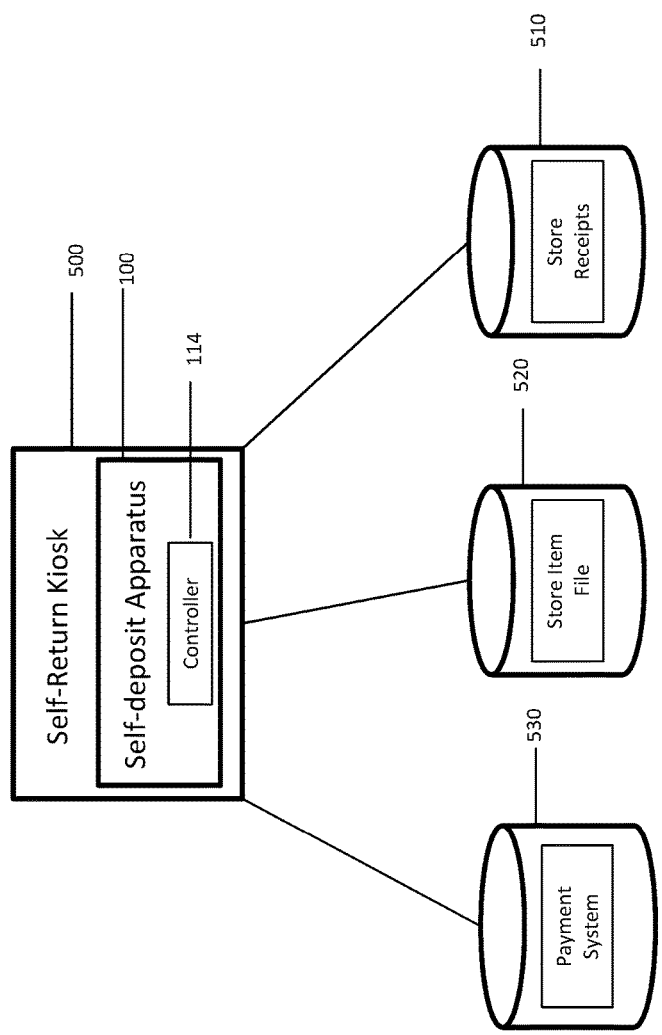
FIG. 5 illustrates the self-deposit apparatus embodied as a self-deposit apparatus according to exemplary embodiments.

FIG. 5 illustrates the self-deposit apparatus 100 according to exemplary embodiments. Embodiments of the self-deposit apparatus 100 described herein with reference to FIGS. 1-4 may be embodied as a self-return kiosk 500 to assist returning items in retail store locations. In exemplary embodiments, a user initiates a self-return at the self-return kiosk 500 by presenting an identifier of an item from a receipt to be read by the optical reader. The user places the item intended for self-return on the scale 112 of the self-return kiosk 500. In exemplary embodiments, the (first) scale 112 is coupled with the optical reader 102 and the image capturing device 110. The scale 112 determines a weight for the item intended for self-return. In exemplary embodiments, while the item intended for self-return is placed on the scale 112, the image capturing device 110 captures one or more images of the item intended for self-return. In exemplary embodiments, the identifier, the weight and the one or more images of the item intended for self-return are provided to the controller 114 of the self-return kiosk 500.

In exemplary embodiments, the controller 114 can extract the dimensions of the item from the one or more images of the item intended for self-return. The controller 114 can extract the height, length, and/or width of the item intended for self-deposit from the image.

In exemplary embodiments, controller 114 can query a store item file 520 to retrieve, a stored weight of the item, stored dimensions of the item, and one or more stored images of the item, using the scanned identifier. The controller 114 can compare the one or more images of the item intended for self-return to the one or more stored images of the item, compare the set of dimensions of the item intended for self-return to the stored dimensions of the item, and/or compare the first weight of the item intended for self-return to the stored weight of the item, to verify that the item intended for self-return is associated with the item identified by the identifier read by the optical reader 102.

In exemplary embodiments, controller 114 determines a probability that the item intended for self-return is associated with the identifier read by the optical reader based on the captured image, the set of dimensions, and the first weight. In exemplary embodiments, the probability is calculated by assigning weighting factors to the comparison of the weight, image and/or dimensions, as described herein.

In exemplary embodiments, the verified item is placed in the bin 106. The self-deposit controller 114 can receive a weight from the (second) scale 122 located in the bin 106 to confirm the item placed on the scale 112 is the same item received by the bin 106. The controller 114 can accept or deny the self-return based on the confirmation that the weight of the item placed on the scale 112 is substantially equal to the weight of the item received by the bin 106. In some embodiments, the bin 106 is configured to receive multiple items for self-return, the scale 112 can be configured to individually weigh each of the items, and the scale 122 can be configured to collectively weigh the items.

In some embodiments, the controller 114 can query user information from the store receipts database 510 using the identifier. The controller 114 can deny the self-return based on past user return history. For example, if the user has a history of abusing the self-return system, the controller 114 can deny that user's self-return attempt.

In exemplary embodiments, once the self-return is accepted, the controller 114 queries the store receipts using the identifier, to retrieve user, price and payment device information at the time of purchase. In exemplary embodiments, the payment device was a credit card or debit card was used at the time of purchase, the controller 114 refunds the price of the item on the credit card or debit card, via the payment system 530. In some embodiments, if the payment device was cash at the time of the purchase the controller 114 issues a retail store gift card, via the payment system 530.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. An apparatus configured to facilitate depositing of items comprising:
   optical reader configured to read an identifier associated with an item;
   a first scale configured to support the item and to determine a first weight of the item;
   an image capturing device configured to capture an image of the item while the item is supported by the first scale;
   a bin for receiving the item subsequent to reading the identifier, determining the first weight, and capturing the image;
   a second scale operatively coupled to the bin, the second scale configured to determine a second weight of the item after the item is placed in the bin; and
   a controller electronically coupled to the optical reader, the image capturing device, the first scale, and the second scale, the controller configured to (i) determine a probability that the item deposited in the bin is associated with the identifier read by the optical reader based on the captured image, the first weight, and the second weight, (ii) verify that the item deposited in the bin is associated with the identifier read by the optical reader based on the probability,
   wherein the controller is further configured to compare the image of the item to a stored image of the item, compare the set of dimensions of the item to a stored set of dimensions of the item, and compare the first weight of the item to a stored weight of the item, the controller being configured to extract the set of dimension of the item from the image using pixel matching.

2. The apparatus in claim 1, wherein the controller is further configured to query a database using the identifier associated with the item to retrieve the stored image of the item and the stored weight of the item.

3. The apparatus in claim 2, wherein the probability is determined by assigning variable weights to the comparison of the image to the stored image, the set of dimensions to the stored set of dimensions, and the first weight to the stored weight.

4. The apparatus in claim 1, wherein the controller uses image mapping of the captured image of the item to estimate the set of dimensions of the item.

5. The apparatus in claim 1, further comprising: a second image capturing device disposed over the bin.

6. The apparatus in claim 1, wherein the bin is configured to receive a plurality of items including the item, the first scale is configured to individually weigh each of the plurality of items, and the second scale is configured to collectively weigh the plurality of items.

7. The apparatus in claim 1, wherein the bin includes a conveyer belt to transport the item to another location after the item is disposed in the bin.

8. A method for verifying deposited items, the method comprising:
   reading, via an optical reader, an identifier associated with an item;
   supporting, via a first scale, the item;
   determining, via the first scale, a first weight of the item;
   capturing an image, via an image capturing device, of the item supported by the first scale;
   receiving the item in a bin disposed adjacent to the first scale after determining the first weight and capturing the image of the item, wherein the bin includes side walls that define an interior area;
   determining, via a second scale operatively coupled to the bin and distinct from the first scale, a second weight of the item after the item is placed in the bin;
   generating, via a controller electronically coupled to a display device, the optical reader, the image capturing device, the first scale, and the second scale, one or more graphical user interfaces on the display device;
   extracting, via the controller, a set of dimensions of the item from the image, the set of dimension of the item being extracted from the image by the controller using pixel matching;
   determining, via the controller, a probability that the item deposited in the bin is associated with the identifier read by the optical reader based on the captured image, the set of dimensions, the first weight and second weight;
   verifying, via the controller, that the item deposited in the bin is associated with the identifier read by the optical reader based on the probability;
   obtaining, via the controller, a stored weight of each of a plurality of items including the item disposed in the bin;
   combining, via the controller, the stored weight of each of the plurality of items to determine a combined stored weight; and
   comparing, via the controller, the combined stored weight to a combined weight of the plurality of items in the bin captured by the second scale.

9. The method in claim 8, further comprising querying, via the controller, a database using the identifier associated with the item, a stored image of the item, a stored weight of the item and a stored set of dimensions of the item.

10. The method in claim 9, further comprising:
    comparing, via the controller, the image of the item to the stored image of the item;
    comparing the set of dimensions of the item to the stored set of dimensions of the item; and
    comparing the first and second weight of the item to the stored weight of the item.

11. The method in claim 10, wherein the probability is determined by assigning variable weights to the comparison of the image to the stored image, the set of dimensions to the stored set of dimensions, and the first weight to the stored weight.

12. The method in claim 9, wherein extracting the set of dimensions from the image comprises estimating the set of dimensions based on image mapping of the image of the item.

13. The method in claim 8, further comprising:
    receiving the plurality of items in the bin; and
    determining, via the second scale, the combined weight of the plurality of items including the item.

14. An apparatus configured to facilitate depositing of items comprising:
    a display device;

a first scale configured to support the item and to determine a first weight of the item;

an image capturing device configured to capture an image of the item while the item is supported by the first scale;

a bin disposed adjacent to the first scale, the bin including side walls that define an interior area for receiving the item after determining the first weight and capturing the image;

a second scale, separate and distinct from the first scale, the second scale operatively coupled to the bin and configured to determine a second weight of the item after the item is placed in the bin; and a controller electronically coupled to the display device, the optical reader, the image capturing device, the first scale, and the second scale, the controller configured to (i) generate one or more graphical user interfaces on the display device, (ii) extract a set of dimensions of the item from the image using pixel matching, (iii) verify that the item deposited in the bin is associated with an identifier based on the captured image, the set of dimensions, and a comparison of the first weight determined by the first scale and the second weight determined by the second scale, (iv) determine incremental increases in weight detected by the second scale as each of a plurality of items including the item is received by the bin, (v) determine an amount of items in the bin based on the incremental increases in weight (vi) compare a combined stored weight to a combined weight of the plurality of items in the bin captured by the second scale.

15. The apparatus in claim 14, wherein the controller is further configured to query a database using the identifier associated with the item to retrieve a stored image of the item, a stored weight of the item and a stored set of dimensions of the item.

16. The apparatus in claim 15, wherein the controller is further configured to compare the image of the item to the stored image of the item, compare the set of dimensions of the item to the stored dimensions of the item, and compare the first weight of the item to the stored weight of the item.

17. The apparatus in claim 16, wherein the controller is configured to determine a probability that the item deposited in the bin is associated with the identifier based on the captured image, the set of dimensions, the first weight and second weight.

18. The apparatus in claim 17, wherein the controller is configured to verify that the item deposited in the bin is associated with the identifier based on the probability.

19. The apparatus in claim 18, wherein the probability is determined by assigning variable weights to the comparison of the image to the stored image, the set of dimensions to the stored dimensions, and the first weight to the stored weight.

* * * * *